Dec. 4, 1923.  
E. H. SNOKE  
RETAINER FOR STARTING CRANK PINS  
Filed Sept. 18, 1923
1,476,378
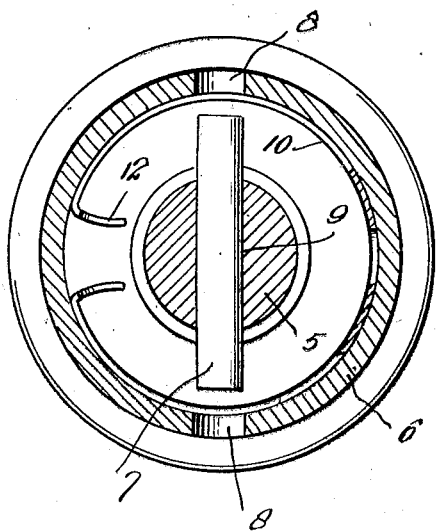
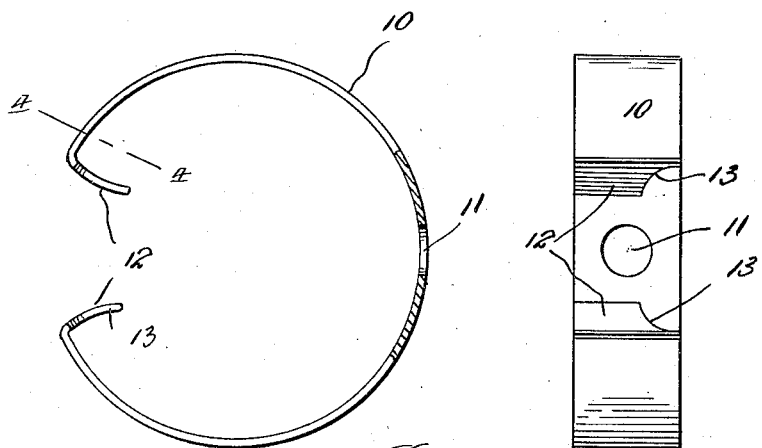
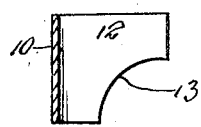
E. H. Snoke,
Inventor Patented Dec. 4, 1923.

1,476,378

UNITED STATES PATENT OFFICE.

EBERT H. SNOKE, OF ORRSTOWN, PENNSYLVANIA.

RETAINER FOR STARTING-CRANK PINS.

Application filed September 13, 1923. Serial No. 663,361.

*To all whom it may concern:*

Be it known that I, EBERT H. SNOKE, citizen of the United States, residing at Orrstown, in the county of Franklin and State of Pennsylvania, have invented certain new and useful Improvements in Retainers for Starting-Crank Pins, of which the following is a specification.

This invention relates to certain new and useful improvements in fan belt pulley attachments, and has particular reference to a means for retaining the starting crank pin of said pulleys within the latter and for guarding against loss of such pins.

In the Ford type of automobile, the crank shaft of the internal combustion engine extends forwardly and has a hollow pulley secured thereon by means of a transverse pin which is utilized for engagement by the usual engine starting hand crank for starting the engine, the pulley being adapted to receive the belt which operates the fan of the engine cooling system. This starting crank pin is positioned in a transverse opening provided through the crank shaft by passing the same through a desired one of transversely aligned openings formed in the rim of a fan belt pulley, but due to vibration and other causes, the pin is liable to become dislodged to such an extent as to pass through one of the pulley openings and become lost, thus leaving the operator of the automobile without means for engagement by the crank whereby the engine may be started. In some instances, it has been proposed to prevent loss of these starting crank pins by passing cotter pins through one end of the same, but the use of these cotter pins is undesirable for the reasons that the same may become dislodged or broken, and are not easily installed.

It is accordingly an object of the present invention to provide a simple and more practical means for preventing accidental loss of these starting crank pins.

Another object of the invention is to provide a starting crank pin retainer which is extremely durable in construction and efficient in operation, and which is characterized by being capable of easy installation and removal.

A still further object of the invention is to provide a starting crank pin retainer of the class described above, wherein the pin retaining action is obtained by closing the openings through the fan belt pulley, the device being of such form and construction as to provide no obstruction to the proper use of the starting crank and its engagement with the starting crank pin.

Other objects of the invention will appear as the nature of the same is better understood, and the invention consists in the novel form, combination and arrangement of parts hereinafter more fully described, shown in the accompanying drawing and claimed.

In the drawing, wherein like reference characters indicate corresponding parts throughout the several views:

Figure 1 is a longitudinal sectional view of a fan belt pulley applied upon the crank shaft of an engine and having a crank pin retaining device, constructed in accordance with the present invention applied thereto, the retaining device being partly in edge elevation and partly in section.

Figure 2 is a view partly in edge elevation and partly in section of the retaining device removed.

Figure 3 is an elevational view of the device shown in Figure 2, looking toward the right of the latter figure, and Figure 4 is a fragmentary sectional view, taken upon the line 4—4 of Figure 2.

Referring more in detail to the drawing, 5 indicates the engine crank shaft or rather the forward projecting end thereof, and 6 represents the usual hollow fan belt pulley which is secured thereon by means of a transverse pin 7, the ends of which are adapted to be engaged by the usual hand starting crank for causing rotation of the shaft 5 in starting the engine. The starting crank pin 7 is inserted after the pulley 6 is placed upon the shaft 5, through a desired one of the pair of opposed openings 8, provided in the rim of the pulley 6 and adapted to be aligned with the opening 9 provided transversely through the crank shaft 5 for reception of the pin 7.

The present invention aims to provide an improved means for preventing the pin 7 working out of the opening 9 through one of the openings 8 of the pulley 6 and thus becoming lost. The device consists of a normally expanded resilient sheet metal ring 10, whose normal diameter is greater than the internal diameter of the rim of the pulley 6 and which is adapted to be manually contracted for insertion within the pulley as shown in Figure 1, whereby when the ring is released it will be allowed to expand into snug contact with the inner surface of the pulley rim as shown. The slit ring 10 is provided with a central transverse opening as at 11, adapted to be aligned with one of the openings 8, when the separated pin 12 of said rings 10 are positioned at opposite sides of the other openings 8 of the pulley rim. When the ring is thus disposed, the pin 7 may be readily inserted, after which the ring 10 is given a partial rotation, so as to move the opening 11 out of register with the openings 8, whereby the remaining portions of the ring 10 will close said openings in the pulley and thereby prevent outward passage of the pins 7 for positively guarding against loss of the latter.

The spaced free ends of the split ring 10 are inturned to provide finger pieces adapted to be pressed together for contracting the ring whereby the latter may be expeditiously applied to the interior of the pulley. The forward edges of the inturned ends 12 are cut away as indicated at 13 in Figures 3 and 4, so as to provide clearance necessary to avoid interfering with the insertion of the starting crank.

In the use of the device, the pulley 6 is placed upon the projecting end of the shaft 5, so that the openings 8 are aligned with the opening 9 of said shaft. The inturned ends of the ring 10 are then pressed together so as to contact the ring to a size sufficiently small to allow insertion of the ring within the pulley, it being understood that the latter is often at its front side at this time. The ring 10 is thus positioned so that the opening 11 thereof is aligned with one of the openings 8, after which the ends 12 are released, for permitting the ring to expand into snug engagement with the inner surface of the pulley rim. The pin 7 is then passed through the openings 8 and the opening 11 which are aligned with each other and then forced into the opening 9 of the shaft 5 to the position shown in Figure 1, after which the free ends 12 of the ring 8 are pressed together and the rings 10 given a quarter turn to the position shown in Figure 1, thus closing the openings 8 by moving the ring so that the opening 11 thereof is positioned out of register with either of the openings 8. The end 7 is then effectively prevented from working out of the pulley and consequently is prevented from passing out of the opening 9 in the shaft.

It will thus be seen that I have provided a very simple, practical, and durable form of retainer for guarding against the loss of starting crank pins.

Minor changes may be made without departing from the spirit and scope of the invention as claimed.

What I claim as new is:

A starting crank pin retainer adapted for application to the interior of a fan belt pulley comprising a normally expanded resilient ring having a transverse opening thru which the starting crank pin may be passed, said ring having inturned free ends in normally spaced relation adapted to be pressed together for contracting the ring, said inturned ends of the ring being cut away at their forward edges for providing clearance for the starting crank.

In testimony whereof I affix my signature.

EBERT H. SNOKE.